United States Patent
Smith

[15] 3,638,971
[45] Feb. 1, 1972

[54] COUPLING

[72] Inventor: Charles Harry Smith, Glendale, Calif.
[73] Assignee: The Rucker Company, Oakland, Calif.
[22] Filed: June 8, 1970
[21] Appl. No.: 44,148

[52] U.S. Cl. .................................285/74, 285/352, 285/368
[51] Int. Cl. .........................................................B60d 1/08
[58] Field of Search.....................285/72, 74, 363, 368, 405, 285/412, 414, 415, 325, 352, 420, 421, 364, 406

[56] References Cited

UNITED STATES PATENTS

| | | | |
|---|---|---|---|
| 2,950,130 | 8/1960 | Schneider | 285/325 X |
| 3,378,283 | 4/1968 | Brocock et al. | 285/374 X |

FOREIGN PATENTS OR APPLICATIONS

| | | | |
|---|---|---|---|
| 972,208 | 8/1950 | France | 285/368 |
| 1,112,421 | 5/1968 | Great Britain | 285/368 |

Primary Examiner—Dave W. Arola
Attorney—Whann & McManigal

[57] ABSTRACT

A coupling having identical collars on adapters with overlapping lugs and bolts to tighten the joint by exerting axial force tending to separate the overlapped lugs.

5 Claims, 6 Drawing Figures

PATENTED FEB 1 1972

CHARLES HARRY SMITH
INVENTOR.

BY William R. Graham
ATTORNEY

CHARLES HARRY SMITH
INVENTOR

BY
William R. Graham
ATTORNEY

COUPLING

This invention has to do generally with couplings for joining hoses, pipe and various conduits, particularly where the pressure differential is not great.

An object of the invention is to provide a novel relatively simple coupling in which both halves are identical thereby providing an easily assembled coupling since it requires no orientation such as is necessary with conventional couplings having male and female ends.

Another object is to provide a coupling which can be easily assembled and tightened in that it requires only a minimum of piloting to assemble one half to the other and in that it requires only a partial turn of the halves and the subsequent turning of a pair of bolts to tighten and secure the joint.

A further object of the invention is to provide a coupling embodying a pair of collars which are so shaped that in addition to their prime function of serving to secure the joint they also serve to protect the sealing area of the joint against damage should either part of the coupling be dropped.

These and other objects will be apparent from the drawing and the following description. Referring to the drawing, which is for illustrative purposes only:

FIG. 5 is a sectional detail view on line 5—5 of FIG. 3; and

Figure 4:
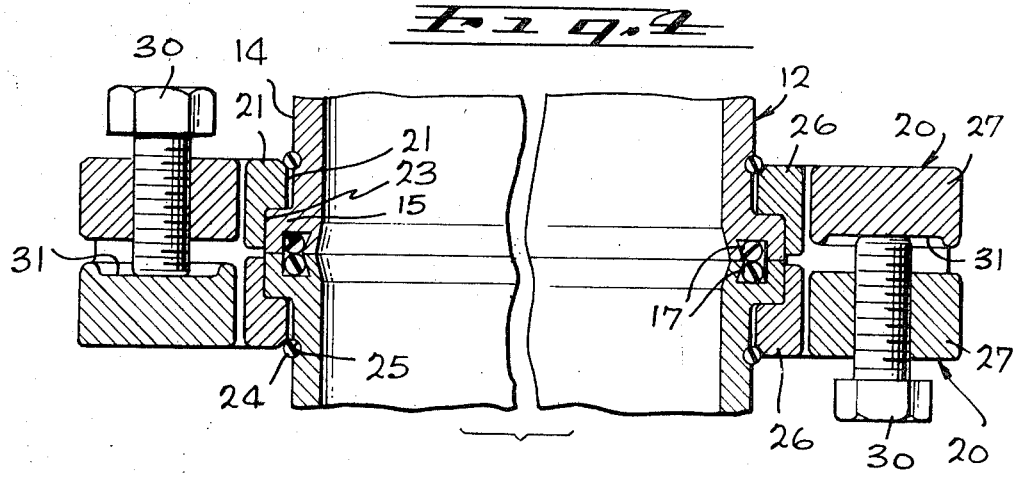
FIG. 4 is a fragmentary sectional view on line 4—4 of FIG. 3, but on a slightly larger scale.

More particularly describing the invention, numeral 11 generally designates an assembled coupling suitable for pipes, conduits or hose. By way of example, the coupling has been shown in a form suitable for use as a hose coupling in that it embodies adapters 12 having serrated shanks 13 to which hoses may be secured in any conventional manner. The adapters are tubular and preferably cylindrical at their forward portion 14 and are shown as provided with a flange 15 at their forward ends. The forward edge of each adapter is provided with an annular groove 16 to receive a seal ring 17, as best seen in FIGS. 4 and 5.

The coupling includes a pair of identical collars designated generally by numeral 20, one of which is mounted on each of the adapters. Each collar has a main body 21 which is generally cylindrical in shape with a stepped inner surface having an inner bore 22 which freely receives portion 14 of the adapter and a counterbore 23 which receives the flanged end of the adapter. The collar is retained by the flange 15 and by a retaining ring 24 received in a groove 25 in the adapter, but is rotatable on the adapter.

Figure 1:
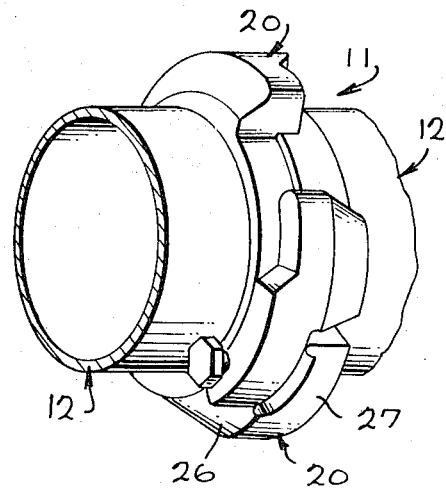
FIG. 1 is an isometric view of an assembled coupling embodying the invention.
Figure 2:
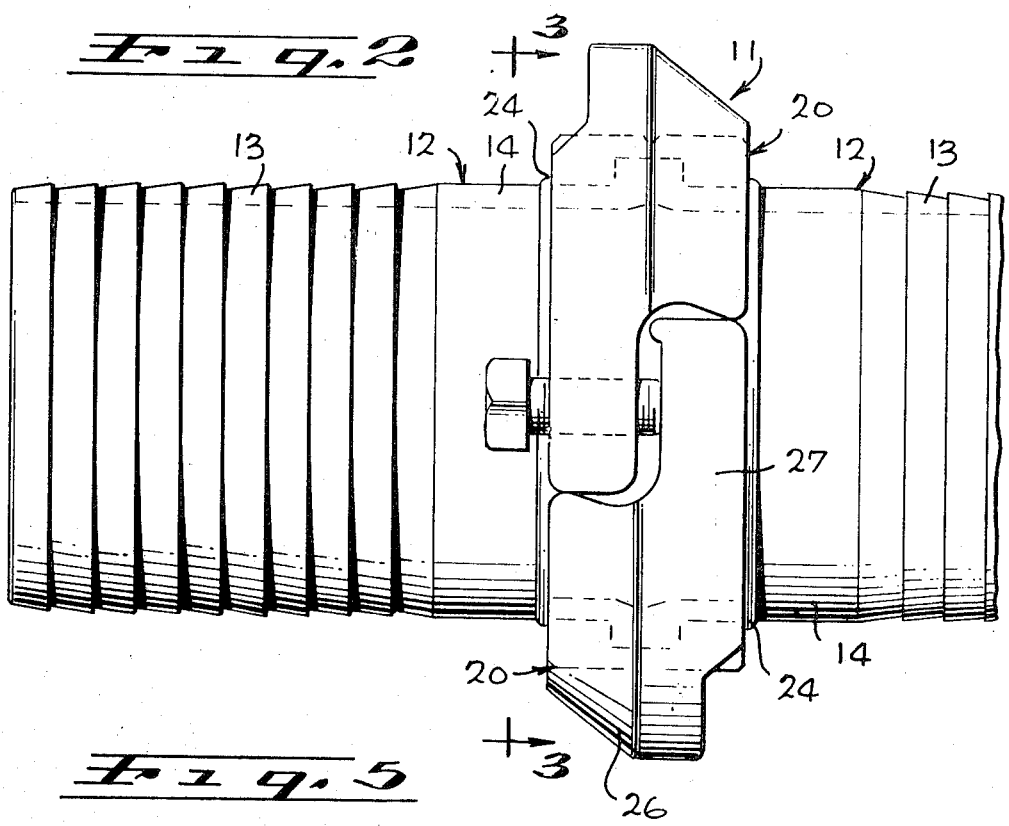
FIG. 2 is a side elevational view of the assembled coupling, but on a larger scale.
Figure 3:
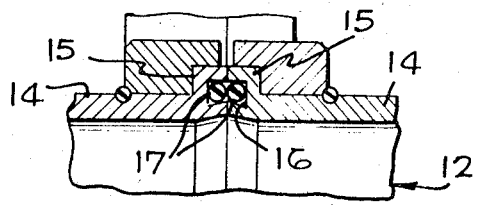
FIG. 3 is a cross-sectional view on line 3—3 of FIG. 2.
Figure 3:
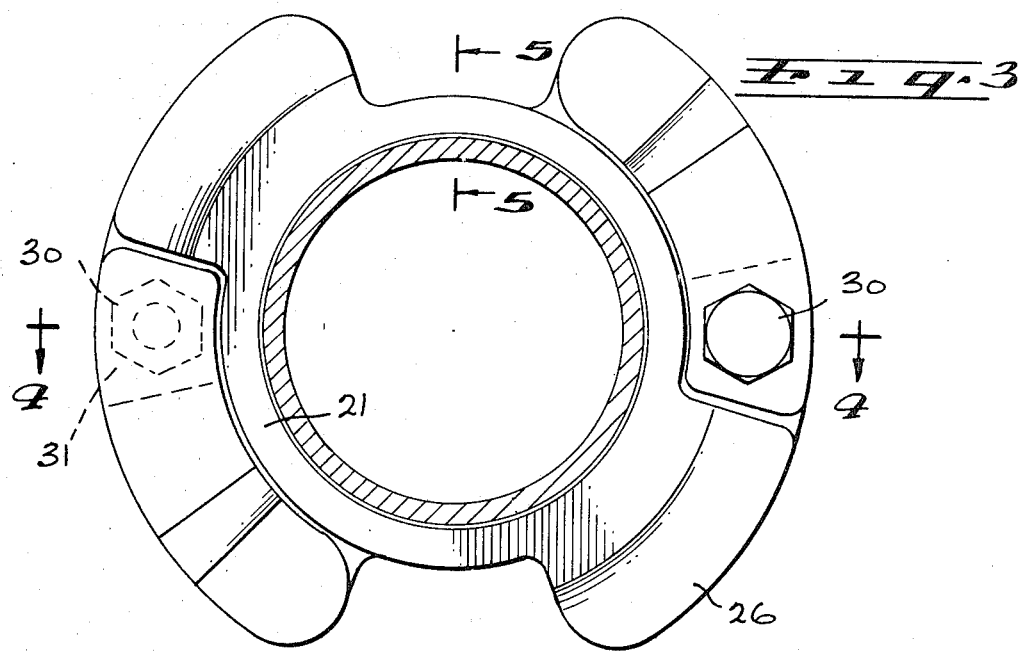

Each collar is formed to provide a pair of circumferentially spaced lug portions having an axially extending body section 26 and a lug 27 extending circumferentially therebeyond. The lugs of each collar are located beyond the plane of the forward edge of its adapter. When the coupling is assembled the lugs of one collar can be oriented to overlap those of the other as best seen in FIGS. 1 and 4. Each collar has a bolt 30 threaded through one of its lugs and adapted to bear against the lug of the other collar in the assembled position of the parts, and preferably each such lug of the other collar is provided with a recess 31 in the face opposing the bolt so that, as will later appear, should the bolts become slightly loose, the joint will nevertheless remain assembled.

Each collar is shown as having two lugs diametrically opposite each other but on large diameter couplings more lugs equispaced about a collar might be used. When the bolts are tightened the joint is made up or tightened bringing the two ends of the adapters and their sealing rings together to provide a fluidtight joint. The force of the bolts is exerted axially of the joint and tends to separate the overlapping lugs of the collars whereby the collars as a whole and the adapters on which they are mounted are in fact urged toward each other. The lengths circumferentially of the lugs is such that the spaces remaining between the ends of the lugs of each are sufficiently great that the parts can be moved past each other when the two halves of the coupling are properly oriented for the purpose of assembly or disassembly, as shown in FIG. 6.

Figure 6:
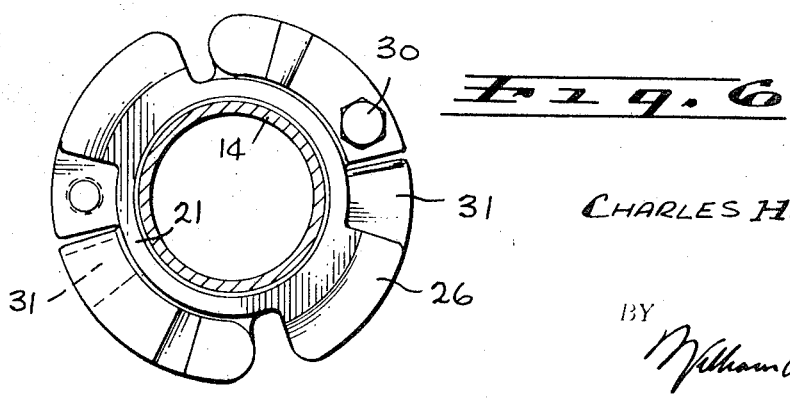
FIG. 6 is a view similar to FIG. 3, but on a smaller scale and showing the parts in a different position.

To assemble the coupling the collars are oriented such that the protrusions or lugs on one collar are opposite the spaces or gaps between the lugs on the other collar, as shown in FIG. 6, and the collars are then moved axially together and rotated in relatively opposite directions until the lugs overlap. The two bolts are then screwed up with the bolt ends fitting into the recesses in the opposite lugs. The steps are performed in reverse order to disassemble the coupling.

I claim:

1. A coupling adapted to secure two cylindrical members in axial alignment, said coupling including a pair of collars mounted on the end of each cylindrical member, at least one of said collars being rotatable on its associated cylindrical member, interengaging means on each collar and cylindrical member preventing axial displacement of the collar from the ends of the cylindrical member, each collar being formed to provide a main cylindrical body around the cylindrical member and having a forward edge terminating in a plane adjacent but rearwardly of the plane of the forward edge of its associated cylindrical member and being further formed to provide at least one lug extending axially forward of the forward edge of the main body and circumferentially of its region of juncture with the main body, said lug being so constructed and arranged that said collars can be brought together axially and subsequently rotated relatively to each other to cause the lug of one collar to overlap behind the lug of the other collar, and means disposed to exert an axial thrust in a direction to separate the overlapping lugs thereby to urge the main bodies of said collars together, there being sealing surfaces on the adjacent ends of said cylindrical members.

2. A coupling comprising a pair of tubular adapters designed to be mounted on the ends of conduits to be coupled, a collar rotatably mounted on the end of each adapter, said collars being substantially identical, interengaging means on each collar and adapter preventing axial displacement of the collar from the end of the adapter, each collar being formed to provide a main cylindrical body around the adapter and having a forward edge terminating in a plane adjacent but rearwardly of the plane of the forward edge of its associated adapter and being further formed to provide a plurality of circumferentially spaced lugs extending forward of the forward edge of the main body and circumferentially of their region of juncture with the main body, said lugs being so constructed and arranged that said collars can be brought together axially and subsequently rotated relatively a short distance to cause the lugs of one collar to overlap behind the lugs of the other collar, bolt means carried by the lugs of said collars disposed to exert an axial thrust in a direction to separate the sets of overlapped lugs whereby to urge the main bodies of the collars together, and seal means between the ends of said adapters.

3. The coupling set forth in claim 2 in which each collar has two lugs.

4. The coupling set forth in claim 2 in which said seal means includes a seal ring provided in the forward edge of at least one of said adapters.

5. The coupling set forth in claim 2 in which said bolt means comprises a bolt in a threaded hole of one of each pair of overlapped lugs and a recess in the face of the other lug of the pair to receive the end of the bolt.

* * * * *